United States Patent
Nagayama

(10) Patent No.: US 6,593,714 B2
(45) Date of Patent: Jul. 15, 2003

(54) MOTOR CONTROL APPARATUS WITH A CURRENT SENSOR DIAGNOSTIC APPARATUS AND A CURRENT SENSOR DIAGNOSTIC METHOD

(75) Inventor: Kazutoshi Nagayama, Fujisawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/906,647

(22) Filed: Jul. 18, 2001

(65) Prior Publication Data

US 2002/0008492 A1 Jan. 24, 2002

(30) Foreign Application Priority Data

Jul. 18, 2000 (JP) ......................... 2000-217359

(51) Int. Cl.[7] ............... H02P 1/24; H02P 1/42; H02P 3/18
(52) U.S. Cl. ........................ 318/254; 324/500
(58) Field of Search ............... 318/727, 700, 318/138, 254, 439, 720, 721, 722, 723, 724, 324, 490; 388/909; 324/219, 260, 500

(56) References Cited

U.S. PATENT DOCUMENTS

| | | | | |
|---|---|---|---|---|
| 4,794,309 A | * | 12/1988 | Saito et al. | 318/9 |
| 4,864,203 A | * | 9/1989 | Kuramoto | 318/563 |
| 4,967,135 A | * | 10/1990 | Ashikaga et al. | 318/808 |
| 5,446,354 A | * | 8/1995 | Hiruma | 318/439 |
| 5,563,489 A | * | 10/1996 | Murry | 318/778 |
| 6,043,624 A | * | 3/2000 | Masaki et al. | 318/723 |
| 6,147,470 A | * | 11/2000 | Ohashi et al. | 318/757 |
| 6,184,647 B1 | * | 2/2001 | Oguro et al. | 318/727 |
| 6,281,656 B1 | * | 8/2001 | Masaki et al. | 318/700 |
| 6,377,017 B2 | * | 4/2002 | Kondou et al. | 318/727 |
| 6,433,504 B1 | * | 8/2002 | Branecky | 318/727 |

FOREIGN PATENT DOCUMENTS

| | | | | |
|---|---|---|---|---|
| JP | 06-253585 | | 9/1994 | |
| JP | 09023501 A | * | 1/1997 | B60L/3/00 |
| JP | 09286378 A | * | 11/1997 | B62M/23/02 |
| JP | 2001119987 A | * | 4/2001 | H02P/7/06 |

* cited by examiner

Primary Examiner—Robert E. Nappi
Assistant Examiner—Eduardo Colon-Santana
(74) Attorney, Agent, or Firm—McDermott, Will & Emery

(57) ABSTRACT

In an inverter which implements drive control on a three-phase AC motor by detecting a first-phase current value and a second-phase current value among three-phase alternating current values with two current sensors, one of the current sensors is determined to be abnormal if one of the absolute value of the deviation of the first-phase current detection value relative to a first current command value and the absolute value of the deviation of the second-phase current detection value relative to a second-phase current command value exceeds a first judgement reference value while the three-phase AC motor is being driven.

9 Claims, 4 Drawing Sheets

| $|\Delta T*|$ [Nm] | $|I1p*|$ [A] | $\alpha$ [A] |
|---|---|---|
| 0 | 0 | 55 |
| 20 | 21 | 76 |
| 40 | 42 | 97 |
| 60 | 63 | 118 |
| 80 | 85 | 140 |
| 100 | 110 | 165 |
| 120 | 138 | 193 |
| 140 | 178 | 233 |
| 160 | 228 | 283 |
| 180 | 292 | 347 |

MOTOR CONTROL APPARATUS WITH A CURRENT SENSOR DIAGNOSTIC APPARATUS AND A CURRENT SENSOR DIAGNOSTIC METHOD

BACKGROUND OF THE INVENTION

1. Field of the Invention

The present invention relates to a motor control apparatus with a current sensor diagnostic apparatus and a diagnostic method adopted for performing diagnosis on an abnormality at a current sensor used in an inverter.

2. Description of the Related Art

There are apparatuses proposed in the known art that perform diagnosis on an abnormality at a current sensor used in an inverter which detects three-phase currents IU, IV and IW by employing three current sensors and implements vector control on a three-phase AC motor (see Japanese Laid-Open Patent Publication No. H6-253585). This type of diagnostic apparatus performs diagnosis on a current sensor abnormality based upon the fact that the sum (IU+IV+IW) of the three-phase alternating currents at a given point in time in the three-phase AC motor is logically 0. Namely, it determines that a current sensor abnormality has occurred if the sum (IU+IV+IW) of the three-phase alternating currents detected at a single point in time by the three current sensors exceeds a judgement reference value.

Since the sum (IU+IV+IW) of the three-phase alternating currents at a given point in time in a three-phase AC motor is logically 0, any two-phase currents among the three-phase alternating currents may be detected to ascertain the remaining one-phase current through an arithmetic operation based upon the two detected currents. Thus, vector control may be implemented in the three-phase AC motor by employing only two current sensors.

SUMMARY OF THE INVENTION

However, with only two current sensors, a current sensor abnormality cannot be diagnosed by adopting the diagnostic method described above to implement vector control on a three-phase AC motor. Namely, since the current value of the remaining one-phase is determined based upon the premise that the sum (IU+IV+IW) of the three-phase alternating currents is 0 at a given point in time, the sum (IU+IV+IW) of the three-phase alternating currents never exceeds the judgement reference value. Thus, with only two current sensors, vector control can be implemented but a current sensor abnormality cannot be diagnosed.

An object of the present invention is to provide a current sensor diagnostic method and a motor control apparatus with a current sensor diagnostic apparatus to be adopted in conjunction with an inverter which implements vector control on a three-phase AC motor by utilizing two current sensors.

The motor control apparatus with a current sensor diagnostic apparatus according to the present invention comprises two current sensors which detect a first-phase current value and a second-phase current value among three-phase alternating currents flowing to a three-phase AC motor, an inverter which implements drive control of a three-phase AC motor based upon the first-phase current detection value and the second-phase current detection value among the three-phase alternating currents flowing to the three-phase AC motor detected by two current sensors and a judging unit which judges whether one of the current sensors is abnormal if either the absolute value of the deviation of the first-phase current detection value relative to a first-phase current command value or the absolute value of the deviation of the second-phase current detection value relative to a second-phase current command value exceeds a first judgement reference value during drive of the three-phase AC motor.

A current sensor diagnostic method for implementing current sensor diagnosis for an inverter which implements drive control on a three-phase AC motor based upon a first-phase current detection value and a second-phase current detection value among three-phase alternating currents flowing to said three-phase AC motor detected by two current sensors comprises calculating a first absolute value of a deviation of the first-phase current detection value relative to a first-phase current command value, calculating a second absolute value of a deviation of the second-phase current detection value relative to a second-phase current command value and determining one of said current sensors to be abnormal if either the first or second absolute value exceeds a first judgement reference value while said three-phase AC motor is being driven.

DETAILED DESCRIPTION OF THE PREFERRED EMBODIMENT

Figure 1:
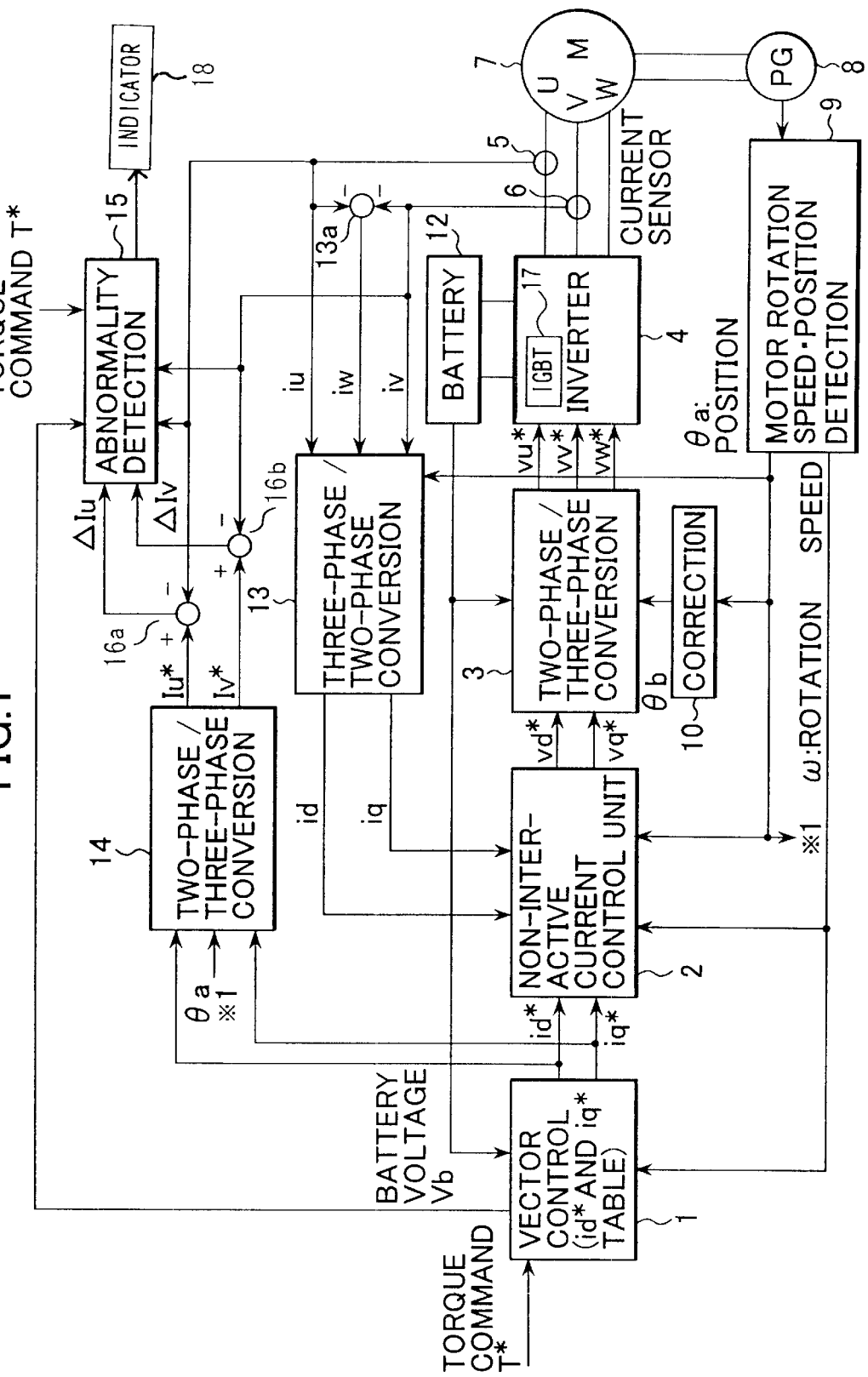
FIG. 1 is a control block diagram illustrating the structure adopted in an embodiment of the motor control apparatus with the inverter current sensor diagnostic apparatus according to the present invention.

FIG. 1 is a control block diagram of an inverter provided with the current sensor diagnostic apparatus in an embodiment. The following is an explanation of the inverter current sensor diagnostic apparatus according to the present invention in reference to an embodiment in which it is adopted in an electric car. It is to be noted that the present invention may be adopted in all other apparatuses that utilize the current sensor diagnostic apparatus as well as in an electric car.

An inverter 4 implements vector control on a three-phase AC motor 7 by employing two current sensors 5 and 6. The current sensor 5 detects a U-phase current iu, whereas the current sensor 6 detects a V-phase current iv. Based upon the following equation (1), a W-phase current iw is calculated in conformance to these alternating currents iu and iv corresponding to the two phases. The W-phase current iw is calculated at a deviation calculator 13a.

$$iw = -iu - iv \tag{1}$$

A vector control unit 1 calculates current command values id* and iq* corresponding to d and q axes by using a current table, based upon a torque command value T* provided for the motor 7, the motor rotational speed $\omega$ and the battery voltage Vb. The current command values id* and iq* corresponding to the d and q axes thus calculated are then provided to a non-interactive current control unit 2 and a two-phase/three-phase conversion unit 14. The non-interactive current control unit 2 calculates voltage command values vd* and vq* corresponding to the d and q axes which will match the actual currents id and iq corresponding to the d and q axes with the corresponding current command values id* and iq*. The voltage command values vd* and vq* thus calculated are then provided to a two-phase/three-phase conversion unit 3.

The two-phase/three-phase conversion unit 3 converts the voltage command values vd* and vq* corresponding to the d and q axes to three-phase AC voltage command values vu*, vv* and vw* in correspondence to a magnetic pole position θb obtained by correcting the magnetic pole position θa of the motor 7. The three-phase AC voltage command values vu*, vv* and vw* are provided to an inverter main circuit 4. The inverter main circuit 4 converts a DC voltage at a battery 12 through chopping an IGBT 17 in conformance to the three-phase AC voltage command values vu*, vv* and vw* and applies the three-phase AC voltages to the motor 7.

A motor rotation speed · position detection unit 9 detects the rotation speed ω and the magnetic pole position θa of the motor 7 via an encoder 8 linked to the output shaft of the motor 7. The magnetic pole position θa thus detected is provided to the non-interactive current control unit 2, a phase correction unit 10, a three-phase/two-phase conversion unit 13 and the two-phase/three-phase conversion unit 14. The phase correction unit 10 corrects for the magnetic pole position θa of the motor 7 based upon the difference between the length of arithmetic processing time at the three-phase/two-phase conversion unit 13 and the length of arithmetic processing time at the two-phase/three-phase conversion unit 3. The phase correction unit 10 outputs the corrected magnetic pole position θb to the two-phase/three-phase conversion unit 3. The battery 12 supplies DC power to the inverter main circuit 4. The three-phase/two-phase conversion unit 13 converts the three-phase alternating currents, i.e., the alternating currents iu detected by the current sensor 5, iv detected by the current sensor 6 and iw calculated in conformance to the values of iu and iv at the deviation calculator 13a to currents id and iq corresponding to the d and q axes with respect to the magnetic pole position θa of the motor 7.

The two-phase/three-phase conversion unit 14, which is provided as a separate unit from the two-phase/three-phase conversion unit 3, converts the current command values id* and iq* corresponding to the d and q axes to U- and V-phase alternating current command values Iu* and Iv* in correspondence to the magnetic pole position θa of the motor 7. These current command values Iu* and Iv* respectively correspond to the voltage command values vu* and vv* mentioned earlier. The abnormality detection unit 15 detects any abnormality in the current sensors 5 and 6 based upon differences ΔIu and ΔIv between the U-and V-phase alternating current command values Iu* and Iv* and the U- and V-phase alternating current values iu and iv detected by the current sensors 5 and 6, and also based upon the U- and V-phase alternating current iu and iv themselves. The abnormality detection unit 15 comprises a microcomputer and peripheral components such as a memory.

Figure 2:
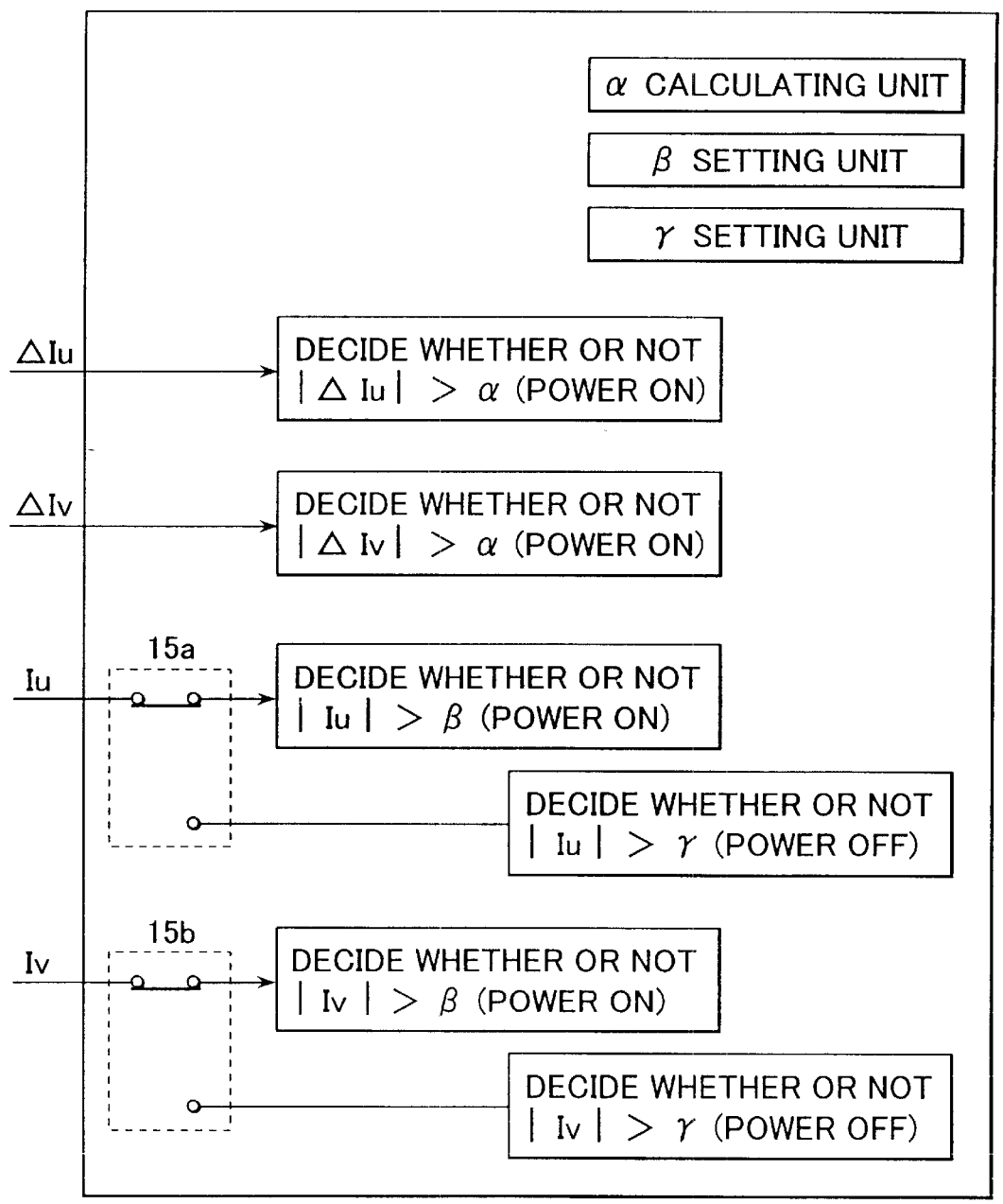
FIG. 2 is a control block diagram illustrating in detail the abnormality detection unit in the motor control apparatus with the inverter current sensor diagnostic apparatus according to the present invention.

FIG. 2 is a control block diagram of abnormality diagnostic processing implemented on the current sensors 5 and 6 at the abnormality detection unit 15. It is assumed that in this embodiment, the motor 7 is in a non-driving state if the U-phase current command value Iu* and the V-phase current command value Iv* are both 0, i.e., if the inverter 4 is not currently engaged in motor drive control. If, on the other hand, either the U-phase current command value Iu* or the V-phase current command value Iv* is not 0, i.e., if the inverter 4 is engaged in a motor drive control, it is assumed that the motor 7 is in a driving state. Diagnosis on the current sensors 5 and 6 is implemented through different methods in a motor driving state and in a non-driving state. Switches 15a and 15b are provided to switch abnormality judgement reference values set for the current sensors 5 and 6 in a motor driving state and in a non-driving state.

In a motor driving state, calculations are made by deviation calculators 16a and 16b based upon the following equations (2) to obtain control deviations ΔIu and ΔIv of the U- and V-phase alternating current values iu and iv detected by the current sensors 5 and 6 relative to the U- and V-phase alternating current command values Iu* and Iv* output from the two-phase/three-phase conversion unit 14.

$$\Delta Iu = Iu^* - iu$$

$$\Delta Iv = Iv^* - iv \qquad (2)$$

The absolute values of the control deviations ΔIu and ΔIv calculated in correspondence to the U- and V-phase current command values and the actual current values are individually compared with a judgement reference value α set in advance. If at least one of the absolute values of the control deviations ΔIu and ΔIv is larger than the judgement reference value α, as indicated in the following expressions (3), the current sensors 5 or 6 are determined to be abnormal.

$$|\Delta Iu| = |(Iu^* - iu)| > \alpha$$

$$|\Delta Iv| = |(Iv^* - iv)| > \alpha \qquad (3)$$

The judgement reference value α is determined based upon the operating states of the inverter 4 and the motor 7 and the control error. The control error is set by taking into consideration the allowable range over which any abnormality occurring in the current sensor 5 and 6 can be diagnosed accurately. The judgement reference value α is to be explained in detail later.

In a motor driving state, the absolute values of the U- and V-phase alternating current values iu or iv are compared with a judgement reference value β set in advance, as well. If the absolute values of the currents iu and iv exceeds the judgement reference value β, as indicated in the following expressions (4), the current sensor 5 or 6 are diagnosed to be abnormal.

$$|iu| > \beta$$

$$|iv| > \beta \qquad (4)$$

The judgement reference value β is set in correspondence to the rated current at the power conversion element such as an IGBT 17 provided at the inverter main circuit 4. The judgement reference value β is determined at the abnormality detection unit 15. In this embodiment, the judgement reference value β is set at; β=400 (A). Since the range of the currents used to drive the motor is 300 (A) or lower in the embodiment, it is ensured by setting the judgement reference value at β=400 (A) that no erroneous diagnosis is made when the current sensors are operating correctly.

In a motor non-driving state, on the other hand, the absolute values of the U- and V-phase alternating current values iu and iv are individually compared with a judgement reference value γ. The current sensor 5 or 6 are diagnosed to be abnormal if the absolute value |iu| of the current iu or the absolute value |iv| of the current iv exceeds the judgement reference value γ, as indicated in the following expressions (5).

$$|iu|>\gamma$$
$$|iv|>\gamma \quad (5)$$

The judgement reference value γ is determined based upon the offset errors at the current sensors 5 and 6 and the error in A/D conversion. The judgement reference value γ is determined by the abnormality detection unit 15. The offset errors in this context refer to the errors of the current values detected by the current sensors 5 and 6 relative to the values of currents that are actually flowing While an overall error of 2% should be allowed in a 600A current sensor, γ is set at 15A to further ensure that no erroneous diagnosis is made in the embodiment.

Now, the method for determining the judgement reference value α is explained. The judgement reference value α is calculated at the abnormality detection unit 15. A current deviation limit value α1 which defines the allowable range of the motor output torque T relative to the motor torque command value T* is set in advance in correspondence to the operating state of the motor 7, i e. the motor rotation speed ω and the battery voltage Vb. α1 constitutes a judgement threshold value when the motor control is implemented in a steady state, and is different in correspondence to a kind and performance of the motor7. In other words, α1 is different in correspondence to a characteristic value such as the size and the weight in electric cars. Even if the motor control is implemented in a steady state in which the change in the torque command value is substantially 0, the motor rotation speed ω and the battery voltage Vb are different in the running conditions of electric cars. α1 is desirable to keep up with the change of these conditions. α1 is set at 55 (A) in the embodiment.

The absolute value |ΔT*(n)| of the difference between the torque command value T*(n−1) used in the previous arithmetic control and the torque command value T*(n) used in the current arithmetic control is calculated through equation (6).

$$|\Delta T^*(n)|=|T^*(n)-T^*(n-1)| \quad (6)$$

If the calculated |ΔT*(n)| is 0, it is decided that the motor control is implemented in a steady state, and accordingly, α1 is set for the judgement reference value α, as indicated in the following expression (7).

$$\alpha=\alpha 1 \text{ (steady motor control)} \quad (7)$$

If, on the other hand, the absolute value |ΔT*(n)| of the difference between the previous torque command value T*(n−1) and the current torque command value T*(n) is not 0, it is decided that the motor control is in a transient state. The method for calculating the judgement reference value α in this situation is now explained. A peak value Ilp*(n−1) of the current command values id*(n−1) and iq*(n−1) corresponding to the d and q axes corresponding to the previous torque command value T* (n−1) and a peak value Ilp*(n) of the current command values id*(n) and iq*(n) corresponding to the d and q axes relative to the current torque command value T*(n) are individually calculated through the following equations (8).

$$Ilp^*(n-1)=\sqrt{(id(n-1)^2+iq(n-1)^2)}$$
$$Ilp^*(n)=\sqrt{(id(n)^2+iq(n)^2)} \quad (8)$$

The absolute value of the difference ΔIlp*(n) between the previous peak value Ilp*(n−1) and the current peak value Ilp*(n) calculated through equations (8) is now calculated through the following equation (9).

$$|\Delta Ilp^*(n)|=|\Delta Ilp^*(n)-\Delta Ilp^*(n-1)| \quad (9)$$

The judgement reference value α is calculated through the following equation (10), by using |ΔIlp*(n)| calculated through equation (9) and α1.

$$\alpha=\alpha 1+|\Delta Ilp^*(n)| \text{(transient motor control)} \quad (10)$$

Figures 3A, 3B:
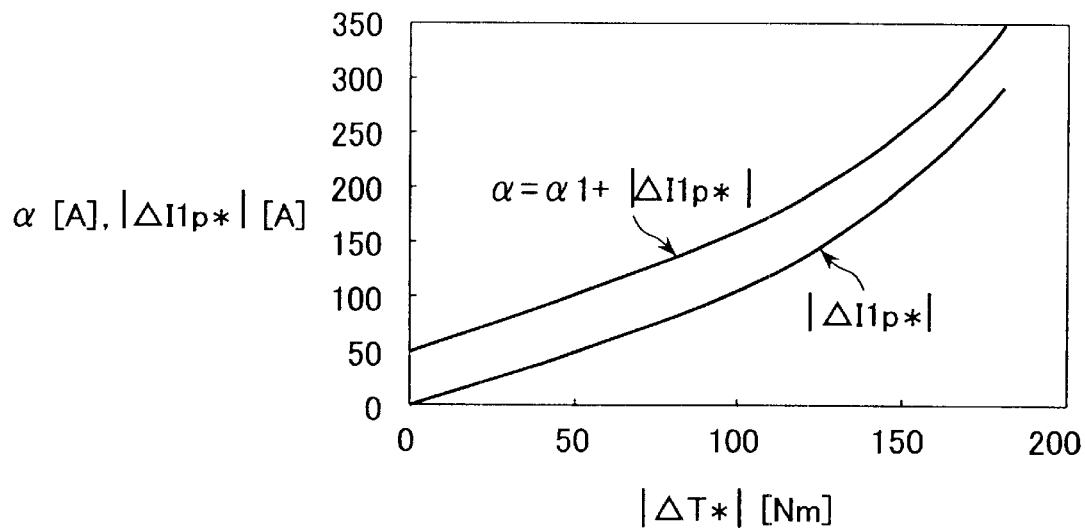
FIG. 3A shows the relationship of $\alpha$ and $|\Delta\, I1p^*|$ to a change $|\Delta T^*|$ in the torque command value manifesting in the embodiment
FIG. 3B shows the numerical relationship among $|\Delta T^*|$, $|\Delta I1p^*|$ and $\alpha$ manifesting in the embodiment.

FIGS. 3A and 3B show the relationship among |ΔT*(n)|, |ΔIlp*(n)| and the judgement reference value α. Namely, FIGS. 3A and 3B show the relationship of α and |ΔIlp*(n)| to the change in the torque command value ΔT* manifesting in the embodiment. As shown in FIG. 3B, the value of |Δ Ilp*(n)| is 110 (A) when, for instance, |ΔT*(n)| is 100 (Nm). By incorporating the values of |ΔIlp*(n)| and α 1=55 (A) in equation (10) through substitution, α is calculated to be 165 (A). Since the absolute value |ΔIlp*(n)| of the change in the peak value of the current command values corresponding to the d and q axes increases in correspondence to an increase in the absolute value |ΔT*| of the change in the torque command value, a relatively large value is set for the judgement reference value α used to make a judgement on the current control deviations during a transient stage in the motor control. As a result, accurate diagnosis can be performed on the current sensors 5 and 6 during a transition stage in the motor control, to prevent an erroneous diagnosis.

Figure 4:
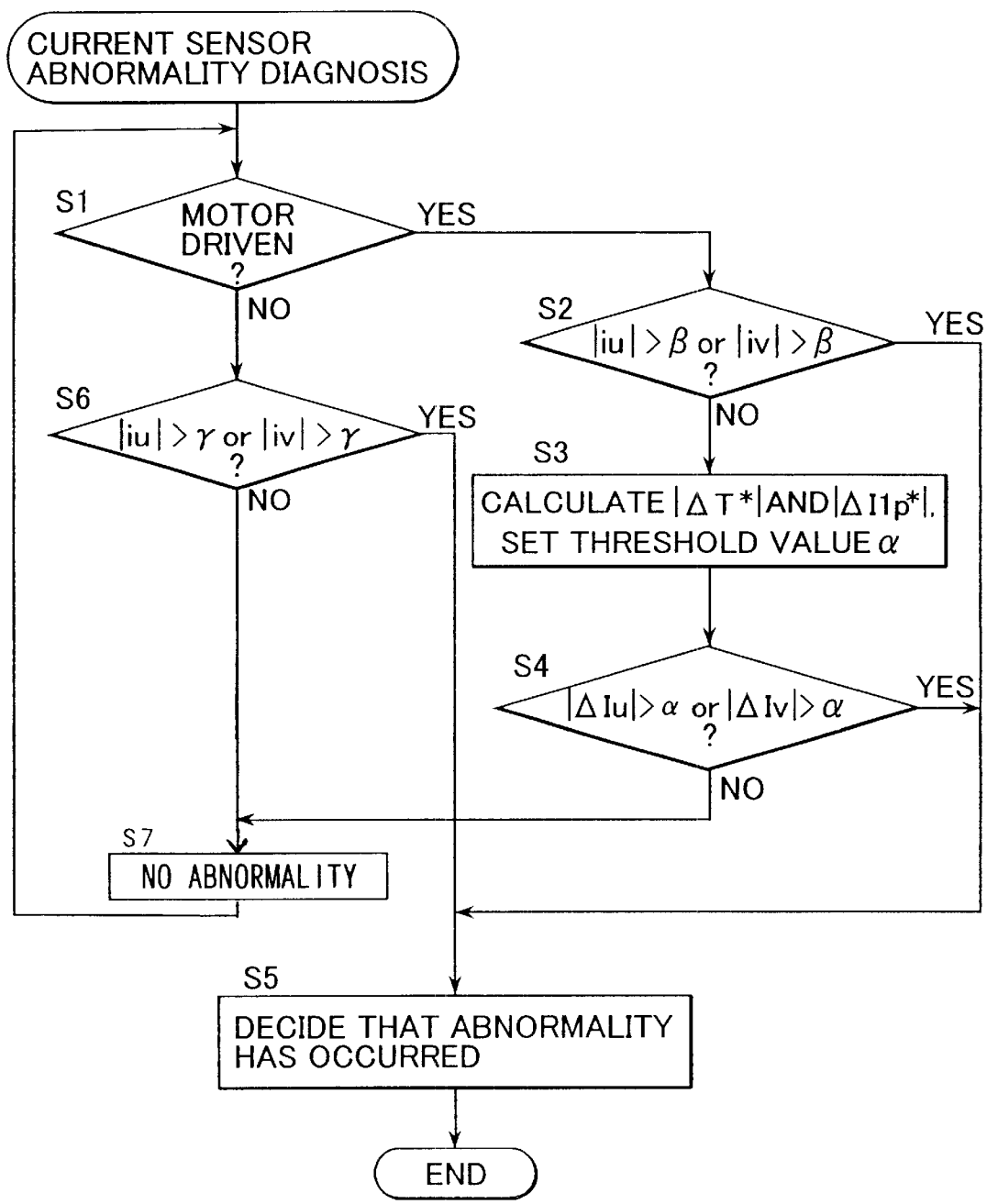
FIG. 4 is a flowchart of the current sensor abnormality diagnostic program used in the embodiment.

FIG. 4 is a flowchart of the abnormality diagnostic program used to perform diagnosis on the current sensors 5 and 6. In reference to this flowchart, a control procedure adopted to perform current sensor diagnosis for the inverter is explained. The microcomputer in the abnormality detection unit 15 executes the current sensor abnormality diagnostic program every specific time intervals.

In step S1, a judgement is made as to whether or not the motor 7 is being driven. A judgement as to whether or not a motor is in a driving state is made based upon whether or not |ΔT*(n)| is 0. The absolute value |ΔT*(n)| (equation (6)) of the change in the torque command value can be calculated as explained above. If it is decided that a motor is in a driving state, the operation proceeds to step S2, whereas the operation proceeds to step S6 if it is decided that the motor is in non-driving state. In step S2, a judgement is made as to whether or not the absolute values |iu| of the U-phase alternating currents detected by the current sensors 5 or |iv| of the V-phase alternating currents detected by the current sensors 6 is larger than the predetermined judgement reference value β. If it is decided that one of the absolute value |iu| and the absolute value |iv| of the U- and V-phase alternating current is larger than the judgement reference value β, the operation proceeds to step S5. In step S5, it is decided that an abnormality has occurred in the current sensor 5 or 6 and diagnostic results indicating an abnormality are output to the indicator 18 to inform the driver of the abnormality occuring.

If it is decided in step S2 that both U- and V-phase alternating currents |iu| and |iv| are equal to or lower than the judgement reference value β, the operation proceeds to step S3. In step S3, |T*(n)| (equation (6)) and |ΔIlp*(n)| (equation (9))are calculated. As described earlier, |ΔT*(n)| is a difference between the torque command values used in the previous arithmetic control and the current arithmetic control and |ΔIlp*(n)| is a difference between the peak values of the previous current command values and the current command values corresponding to the d and q axes. The judgement reference value α (equation (7) or equation (10)) is set as explained above based upon the results of the calculation.

The operation proceeds to step S4 once the judgement reference value α is set. In step S4, the absolute values |ΔIu| and |ΔIv| of the control deviations between the U- and V-phase current command values and the actual U-and V-phase current values are calculated (expressions (3)) and a judgement is made as to whether or not |ΔIu| or |ΔIv| is larger than the judgement reference value α. If one of the control deviation absolute value |ΔIu| and the control deviation absolute value | Iv| is determined to be larger than the judgement reference value α, the operation proceeds to step S5. In step S5, it is decided that the current sensor 5 or 6 is abnormal and diagnostic results indicating an abnormality are output to the indicator 18 as described above. If, on the other hand, it is decided in step S4 that both the control deviation absolute values |ΔIu| and |ΔIv| are equal to or lower than the judgement reference value α, the operation proceeds to step S7. In step S7, it is decided that the current sensors 5 and 6 are not abnormal and diagnostic results indicating that they do not manifest an abnormality are output.

In a motor non-driving state, the operation proceeds from step S1 to step S6. In step S6, a judgement is made as to whether or not one of the absolute values |iu| of the U-phase alternating currents and |iv| of the V-phase alternating currents is larger than the judgement reference value γ set in advance. If it is decided that one of the absolute value |iu| of the U-phase alternating current and |iv| of the V-phase alternating current is larger than the judgement reference value γ, the operation proceeds to step S5 to determine that the current sensor 5 or 6 is abnormal and diagnostic results indicating an abnormality are output to the indicator 18. If, on the other hand, the absolute values |iu| and |iv| of the U- and V-phase alternating currents are both determined to be equal to or smaller than the judgement reference value γ, the operation proceeds to step S7. In step S7, it is decided that the current sensors 5 and 6 are not abnormal and diagnostic results indicating that they are not abnormal are output.

As explained above, in a motor driving state, it is decided that an abnormality has occurred at the current sensor 5 or 6 if one of the absolute values |ΔIu| and |ΔIv| of the control deviations of the actual currents iu and iv detected by the current sensors 5 and 6 relative to the current command values Iu* and Iv* exceeds the judgement reference value α or if one of the absolute values |iu| and |iv| of the actual currents detected by the current sensors 5 and 6 exceeds the judgement reference value β. In a motor non-driving state, the current sensor 5 or 6 is determined to manifest an abnormality if one of the absolute values |iu| and |iv| of the actual currents detected by the current sensors 5 and 6 exceeds the judgement reference value γ. Thus, accurate diagnosis can be made with regard to any abnormality in the current sensors 5 and 6 even when implementing vector control on a three-phase AC motor by employing two current sensors 5 and 6.

Since the judgement reference value α is increased in correspondence to the extent to which the peak value of the d and q axes current command values increases, i.e., in correspondence to the extent to which the current command values increase when the motor torque command value input to the inverter 4 increases, any abnormality occurring in the current sensors 5 and 6 can be diagnosed accurately during a transient stage in the motor control.

It is to be noted that while an explanation is given above in reference to the embodiment on an example in which the present invention is adopted in conjunction with a vector-control inverter, the present invention may be adopted in an inverter other than a vector-control inverter. In application in an inverter other than a vector-control inverter, too, advantages similar to those achieved in the embodiment are realized.

The present invention is not limited to the example presented in the embodiment. Namely, the present invention may be adopted in all types of inverter current sensor diagnostic methods and inverter current sensor diagnostic apparatuses.

The disclosure of the following priority application is herein incorporated by reference:
Japanese Patent Application No. 2000-217359, filed Jul. 18, 2000

What is claimed is:

1. A motor control apparatus with a current sensor diagnostic apparatus that performs current sensor diagnosis, comprising;
   two current sensors which detect a first-phase current value and a second-phase current value among three-phase alternating currents flowing to a three-phase AC motor,
   an inverter which implements drive control on said three-phase AC motor based upon the first-phase current detection value and the second-phase current detection value detected by said two current sensors, and
   a judging unit which judges whether one of said current sensors is abnormal if either an absolute value of a deviation of the first-phase current detection value relative to a first-phase current command value or an absolute value of a deviation of the second-phase current detection value relative to a second-phase current command value exceeds a first judgement reference value during the drive of said three-phase AC motor.

2. A motor control apparatus according to claim 1, wherein;
   the first judgement reference value is determined based upon operating states of said inverter and said three-phase AC motor and a control error.

3. A motor control apparatus according to claim 1, wherein;
   said judging unit which also judges one of said current sensors is abnormal if either an absolute value of the first-phase current detection value or an absolute value of the second-phase current detection value exceeds a second judgement reference value during the drive of said three-phase AC motor.

4. A motor control apparatus according to claim 3, wherein;
   the second judgement reference value is determined in correspondence to an allowable current at a power conversion element of said inverter.

5. A motor control apparatus according to claim 1, wherein;
   said judging unit which also judges one of said current sensors is abnormal if either an absolute value of the first-phase current detection value or an absolute value of the second-phase current detection value exceeds a third judgement reference value while said three-phase AC motor is not being driven.

6. A motor control apparatus according to claim 5, wherein;
   the third judgement reference value is determined based upon an offset error at said current sensors and an error occurring during A/D conversion.

7. A motor control apparatus according to claim 1, wherein;
   if a motor torque command value input to said inverter increases, the first judgement reference value is increased in correspondence to the extent of change in the current command values.

8. A current sensor diagnostic method for implementing current sensor diagnosis for an inverter which implements drive control on a three-phase AC motor based upon a first-phase current detection value and a second-phase current detection value among three-phase alternating currents flowing to said three-phase AC motor detected by two current sensors, comprising;
   calculating a first absolute value of a deviation of the first-phase current detection value relative to a first-phase current command value,
   calculating a second absolute value of a deviation of the second-phase current detection value relative to a second-phase current command value, and
   determining one of said current sensors to be abnormal if either the first or second absolute value exceeds a first judgement reference value while said three-phase AC motor is being driven.

9. A current sensor diagnostic apparatus that performs current sensor diagnosis for an inverter which implements drive control on a three-phase AC motor based upon a first-phase current detection value and a second-phase current detection value among three-phase alternating currents flowing to said three-phase AC motor detected by two current sensors, comprising;
   a first detection calculation means for calculating a first absolute value of a deviation of the first-phase current detection value relative to a first-phase current command value,
   a second detection calculation means for calculating a second absolute value of a deviation of the second-phase current detection value relative to a second-phase current command value, and
   a determination means for determining whether one of said current sensors is abnormal if either the first or second absolute value exceeds a first judgement reference value while said three-phase AC motor is being driven.

* * * * *